United States Patent
Hsing et al.

(10) Patent No.: US 6,829,620 B2
(45) Date of Patent: Dec. 7, 2004

(54) TABLE-LEVEL UNICODE HANDLING IN A DATABASE ENGINE

(75) Inventors: Chi-Pei Michael Hsing, San Jose, CA (US); Alan Tsu-I Yaung, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 346 days.

(21) Appl. No.: 09/957,969

(22) Filed: Sep. 20, 2001

(65) Prior Publication Data

US 2003/0078921 A1 Apr. 24, 2003

(51) Int. Cl.[7] .............................................. G06F 17/00
(52) U.S. Cl. .................................... 707/104.1; 707/102
(58) Field of Search ................................ 707/100, 102, 707/104.1, 1, 3, 4; 711/118; 341/90; 715/536; 712/300

(56) References Cited

U.S. PATENT DOCUMENTS

| | | | | |
|---|---|---|---|---|
| 5,586,241 A | | 12/1996 | Bauermeister et al. ...... | 395/167 |
| 5,706,462 A | * | 1/1998 | Matousek ................... | 711/118 |
| 5,787,452 A | * | 7/1998 | McKenna ................... | 715/536 |
| 5,793,381 A | | 8/1998 | Edberg et al. .............. | 345/467 |
| 5,963,155 A | * | 10/1999 | Cheng et al. ................ | 341/90 |
| 6,049,869 A | * | 4/2000 | Pickhardt et al. ........... | 712/300 |

* cited by examiner

*Primary Examiner*—Safet Metjahic
*Assistant Examiner*—Sana Al-Hashemi
(74) *Attorney, Agent, or Firm*—Sandra M. Parker, Esq.

(57) ABSTRACT

A system, a program storage device and a software method for efficient handling of multiple Unicode formats in the same database on a table level is provided. The routines of the method are used to create a plurality of database tables and specify each table data storage format, including a first table for storing data in a first Unicode format and a second table for storing data in a second Unicode format. The method inputs characters which are encoded in the first Unicode format. When the data should be stored in the second Unicode format, the method uses a conversion routine for transforming some inputted characters into the second Unicode format and stores them in the second table, and then stores unconverted inputted characters in the first table. The first Unicode format is preferably the UCS-2 format and the second Unicode format is the UTF-8 format.

15 Claims, 3 Drawing Sheets

TABLE-LEVEL UNICODE HANDLING IN A DATABASE ENGINE

BACKGROUND OF THE INVENTION

1. Field of the Invention

This invention relates in general to database management systems performed by computers, and in particular to the Unicode character handling in relational database management systems.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

Inside a computer the text must be represented in digital form and thus a character set encoding routine must be used to encode each text character with a unique digital representation. In the USA the American Standard Code for Information Exchange (ASCII) 7-bit sequence is used for encoding text characters. In Europe it is the International Standard Organization (ISO) standard that is followed. In Japan, the dominant character encoding standard is the Japan Standard Association (JSA) standard. With the globalization of economies throughout the world, it became necessary to implement computer systems which support and handle multiple languages' characters and encode them to digital form.

The Unicode standard was developed to provide an international character encoding standard to support the internationalization of software. Unfortunately, compared with ASCII characters, Unicode characters take more storage space in a file system supporting a DBMS database engine. In large database systems, as a database grows, a lot more space will be consumed in the Unicode format. This problem is very noticeable in pervasive devices, such as handheld computers running Windows CE, where it is very important to save space due to memory restriction.

The Unicode character encoding standard is a fixed-length character encoding scheme that includes characters from almost all existing languages of the world. Unicode characters are usually shown as a character string "U+xxxx" where xxxx is the hexadecimal code of the character. Each Unicode character is 16 bits (2 bytes) long, regardless of the language of the character. The International Organization for Standardization (ISO) and International Electrotechnical Commission (IEC) 10646 standard (ISO/IEC 10646) specify a 2-byte version of the Universal Multiple-Octet Coded Character Set (UCS-2), often used for Unicode encoding.

Also in use is the UTF-8 format (UCS Transformation Format 8), which is an algorithmic transformation that transforms fixed-length UCS-2 characters into variable-length byte strings. In the UTF-8, ASCII characters are represented by their usual single-byte codes, but non-ASCII characters become two or three bytes long. Thus, the UTF-8 transforms UCS-2 characters to a multi-byte codeset, for which ASCII is invariant.

Many conventional data storage products, such as the product sold under the trademark IBM DB2 UDB, can take either UNICODE (UCS-2) or ASCII user input strings and save them in storage devices in the UTF-8 format. The reasons for this conversion are several. One reason is to save space, because for an English-only system, each UTF-8 character takes only one byte, where an UCS-2 character would take two bytes. Another reason is consistency. Saving all different input string formats into one common format, such as UTF-8, makes data comparison or "join" possible without additional data transformation. Moreover, some systems, like DB2 Everyplace, have difficulties in handling strings internally when the strings contains value '0x00', which is common with UCS-2 strings. The UTF-8 strings do not contain value '0x00'.

However, the conventional systems have two main drawbacks. For Asian languages, such as Chinese or Japanese, most characters will take three bytes in the UTF-8 format and only two bytes in the UCS-2 format. Therefore, the UTF-8 format requires bigger storage space than needed when using the UCS-2 format, which is a fixed 2-byte format. Thus, it is obvious that in a Chinese-only system, the UCS-2 format should be the format of choice instead of the UTF-8 format. Moreover, since each Chinese character may take two or three byes in the UTF-8 format, it is impossible for a designer/developer to predict how much space is needed to save a number of Chinese characters. That results is either not enough or too much allocated space.

Therefore, there is a need to provide a method and a system that can improve Unicode character string storage usage and string length calculation in database management systems.

SUMMARY OF THE INVENTION

The foregoing and other objects, features, and advantages of the present invention will be apparent from the following detailed description of the preferred embodiments which makes reference to several drawing figures.

One preferred embodiment of the present invention includes a software method for efficient handling of multiple Unicode formats in the same database on a table level. The routines of the method are used to create a plurality of database tables and specify each table data storage format, including a first table for storing data in a first Unicode format and a second table for storing data in a second Unicode format. The method inputs characters which are encoded in the first Unicode format. When the data should be stored in the second Unicode format, the method uses a conversion routine for transforming some inputted characters into the second Unicode format and stores them in the second table, and then stores unconverted inputted characters in the first table. The first Unicode format is preferably the UCS-2 format and the second Unicode format is the UTF-8 format.

Another preferred embodiment of the present invention is a system implementing the above-mentioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized, and structural and functional changes may be made without departing from the scope of the present invention.

The present invention is directed to a system, method and computer program storage device embodying a program of instructions executable by a computer to perform the method of the present invention that can improve Unicode character string storage usage and string length calculation in database management systems. The preferred embodiments of the present invention introduce two new concepts to the Unicode handling in a database engine. Firstly, multiple Unicode string formats (e.g., UTF-8 and UCS-2) are allowed in the physical storage of the same database. Secondly, the scope of a specific Unicode format is a table, and not the entire database The handling of multiple Unicode formats (e.g., UTF-8 and UCS-2) in the physical storage of the same database solves all the problems that exist in conventional systems. In the present invention the Asian characters can be stored in the UCS-2 format to save space, and thus the length of a character string can be easily calculated since UCS-2 defines a fixed two-byte format. When the UTF-8 format is needed for some characters it can be easily obtained by transformation from their UCS-2 format. Moreover, since in the present invention the scope of a specific Unicode format is contained to a table, this allows the user to mix multiple Unicode formats in the same database at the table level, which gives database administrators the flexibility in managing the database table space. The present invention can be used to improve the Unicode handling in many database systems, such as IBM DB2 UDB or Oracle Database systems.

Figure 1:
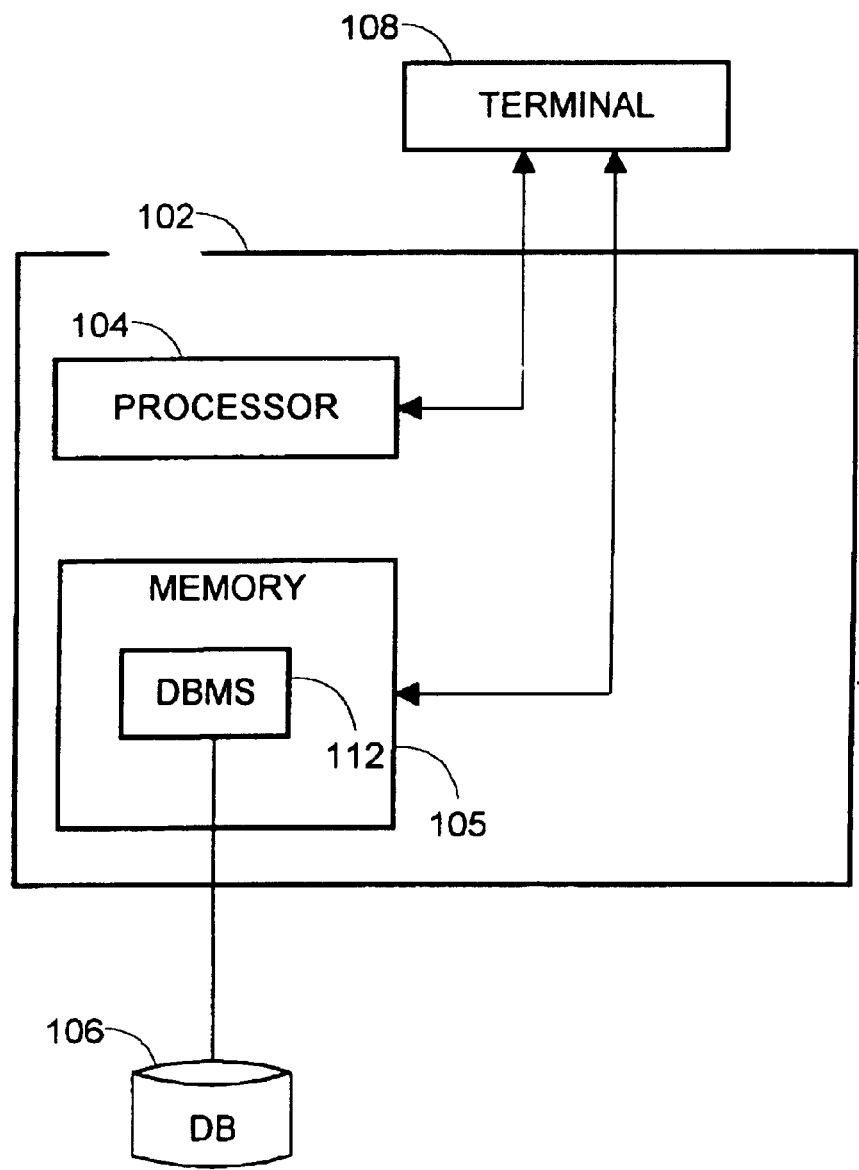
FIG. 1 illustrates a computer hardware and software environment usable in the present invention.

FIG. 1 illustrates an exemplary computer hardware environment that could be used with the present invention. Those skilled in the art will recognize that any combination of components, including computer hardware, peripherals and other devices, computer system software programs and application programs may be used to implement the present invention, so long as similar functions are performed thereby. Many modifications of the proposed preferred embodiments may be made without departing from the scope of the present invention.

In the exemplary environment, a computer system 102 is comprised of one or more processors 104 with a computer memory 105, connected to one or more electronic storage devices 106, such as disk drives, that store one or more relational databases. These drives may comprise, for example, optical disk drives, magnetic tapes and/or semi-conductor memory. Each storage device permits receipt of a computer program storage device, such as a magnetic media diskette, magnetic tape, optical disk, semiconductor memory and other machine-readable storage device, and allows for method program steps recorded on the program storage device to be read and transferred into the computer memory 105. The recorded program instructions may include the code for the method embodiments of the present invention. Alternatively, the program steps can be received into the memory 105 from a computer over a network.

Operators of the computer system 102 use a standard operator terminal interface 108 with a graphical user interface, such as provided by Microsoft Windows or one of the UNIX GUIs, or other similar interface, to transmit electrical signals to and from the computer system 102, that represent commands for performing various search and retrieval functions, termed queries, against the databases. In the present invention, these queries conform to the Structured Query Language (SQL) standard, and invoke functions performed by a DBMS 112, which is preferably a Relational DataBase Management System (RDBMS) software. In the preferred embodiment of the present invention, the RDBMS software is the DB2 product offered by IBM for the UNIX AIX operating system, as well as for HP-UX, Sun Solaris and Windows operating system. Those skilled in the art will recognize, however, that the present invention has application to any RDBMS software that uses SQL, and may similarly be applied to non-SQL queries.

Figure 2:
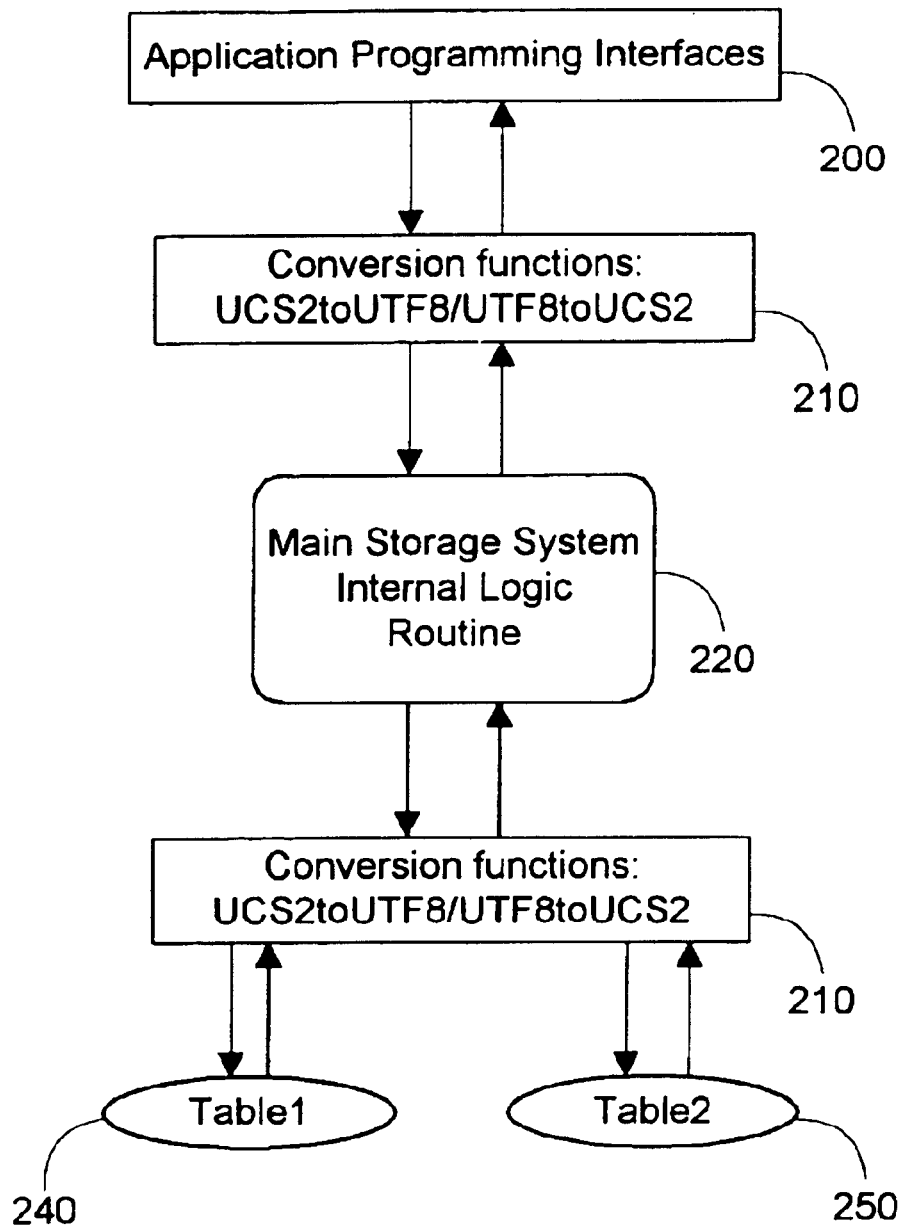
FIG. 2 illustrates a software system overview diagram, according to the preferred embodiments of the present invention.

FIG. 2 illustrates a simplified diagram of a database storage system software implementing preferred embodiments of the present invention and executable in the system of FIG. 1. It consists of a set of Application Programming Interfaces (APIs) 200 allowing a user to create tables with multiple Unicode string formats to set to and retrieve data from a database. Some of these APIs are interfaces dbCreateTable( ), dbSetData( ), and dbGetData( ), according to the preferred embodiments of the present invention. They assist a user in selecting tables and data formats via a keypad, mouse, etc, of the terminal interface 108 or via Internet.

A UTF8toUCS2/UCS2toUTF8 data conversion routine 210 of the present invention is useable, if needed, after the data are supplied to or from a main storage system internal logic routine 220. The same UTFtoUCS2/UCS2toUTF8 data conversion routine 210 may be used before the data is set or retrieved from physical tables, such as Table1 240 and Table2 250, created with the dbCreateTable( ) API. Each table may store characters in a different Unicode format. The main storage system internal logic routine 220 is performed by the DBMS database engine internal operation modules, such as a query parser or optimizer routine, for the query analysis and optimization.

Figure 3:
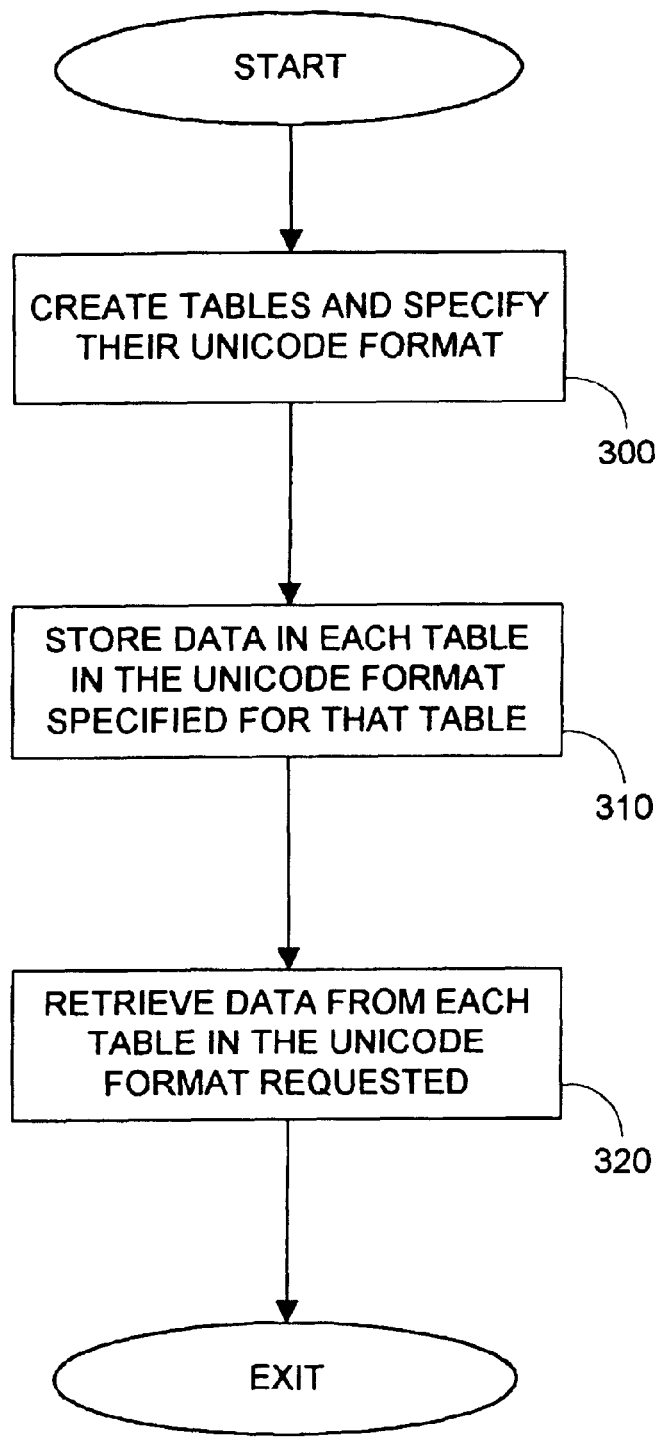
FIG. 3 illustrates a flowchart of the method useable with the software system of FIG. 2, according to the preferred embodiments of the present invention.

FIG. 3 is a flowchart illustrating the steps necessary for the proper utilization of the software module of the present invention, also shown in the pseudocode below. The method embodiment of the present invention includes the following steps. Firstly, in step 300 a user creates tables, possibly having multiple Unicode string formats, through the dbCreateTable( ) APIs, which specify each table Unicode format. For example, a Table1 may use the UCS-2 format, and a Table2 may use the UTF-8 format. In step 310 the user invokes the dbSetData( ) APIs to put a string, that in this example has four Chinese characters, into the Table1 and Table2 in different Unicode formats.

In the example shown in pseudocode below, the input string for these four Chinese characters has UCS-2 characters 0x6771(i.e., east in English), 0x897F (i.e., west in English), 0X5357 (i.e., south in English), and 0X5317 (i.e., north in English). The input string is saved in the Table1 in its input UCS-2 format as: 0x6771, 0x897F, 0x5357, 0x5317, and takes eight bytes. The same string is saved in the Table2 in the UTF-8 format as: (E6,9D,B1), (E8,A5,BF), (E5,8D,97), and (E5,8C,97), which takes twelve bytes. In step 320 the user invokes the dbGetData( ) APIs to retrieve data from the Table1 and Table2 in the UCS-2 format. According to the preferred embodiments of the present invention, the APIs dbSetData( ) and dbGetData( ) are coded to include the UTF8toUCS2/UCS2toUTF8 data conversion routine, which is used when needed, such as when handling the data to/from the Table2, because they are in UTF-8 format.

In a conventional DB2 system, a command to create a UCS-2 database with the territory code for the United States is as follows: DB2 CREATE dbname USING CODESET UTF-8 TERRITORY US. The scope of this command has to be the entire database, and cannot be each individual table.

As shown above, the preferred embodiments of the present invention efficiently handle Unicode storage space usage and space allocation, since they have the three advantages of a pure UTF-8 system, without the drawbacks mentioned above. The first advantage is that, even in an English-only system, a user can create some tables in the UTF-8 format to save space. The second advantage is that the main storage system internal logic routine 220 can store and retrieve data from the tables in the desired format, using the data conversion routine. The comparison and join operations work well in the present invention. The third advantage is that, for the system that cannot handle the UCS-2 format strings by the main storage system internal logic routine 220, the present invention can convert a string from the UCS-2 format to the UTF-8 format before saving the string in the table or while retrieving the string from the table.

Moreover, the present invention does not have the drawbacks of the conventional systems. For a Chinese-only system a user can create tables as the UCS-2 format, which saves significant space, as shown in the example. Since in that case a developer/designer knows that each character will take exactly two bytes of storage space, he/she can allocate the exact space for the string storage.

Following is the pseudocode of the sample routine according to the method illustrated in FIG. 3:

```
#include <stdio.h>
#include "DBEngine.h"
int main(int argc, char * argv[])
{
    int rc = 0, i = 0;
    wchar_t inUCS2[32] = {'\0'};
    wchar_t outUCS2T1[32] = {'\0'};
    wchar_t outUCS2T2[32] = {'\0'};
    //*********************************************
    //* Create table "Table1" as UCS-2 format
    //* Create table "Tabls2" as UTF8 format
    //*********************************************
    rc = dbCreateTable(L"Table1", DBUCS2); //UCS2 table
    rc = dbCreateTable(L"Table2", DBUTF8); //UTF8 table
    //*********************************************
```

-continued

```
//* Put string that has four Chinese characters into tables
//* "Table1", and "Table2"
//*********************************************
inUCS2[0]= 0x6771; //east in Chinese
inUCS2[1]= 0x897F; //west in Chinese
inUCS2[2]= 0x5357; //south in Chinese
inUCS2[3]= 0x5317; //north in Chinese
rc = dbSetData(L"Table1",inUCS2); //saved as 8 bytes
rc = dbSetData(L"Table2",inUCS2); //saved as 12 bytes
//*********************************************
//* Get data from "Table1" and "Table2" as UCS-2 format
//*********************************************
rc = dbGetData(L"Table1", outUCS2T1);
printf("\nOutput from Table1 = ");
for ( i=0 ; i < (int) wcslen(outUCS2T1); i ++ ){
    printf("0X%x ",outUCS2T1[i]);
}
rc = dbGetData(L"Table2", outUCS2T2);
printf("\nOutput from Table2 = ");
for ( i=0 ; i < (int) wcslen(outUCS2T2); i ++ ){
    printf("0X%x ",outUCS2T2[i]);
}
return 0;
}
```

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A software method for efficient handling of multiple Unicode formats in the same database on a table level, the method comprising the following steps:

(a) creating a plurality of database tables and specifying the table data Unicode format, including a first table for storing data in a first Unicode format and a second table for storing data in a second Unicode format;

(b) inputting characters encoded in the first Unicode format;

(c) when the table data Unicode format being the second Uniform format, transforming inputted characters into the second Unicode format and storing them in the second table; and (d) storing unconverted inputted characters in the first table.

2. The method according to claim 1, wherein the method allowing efficient Unicode characters storage and character string length calculation in a computer data storage system.

3. The method according to claim 1, wherein the first Unicode format being the UCS-2 format and the second Unicode format being the UTF-8 format, and the transforming step converting characters from the fixed-length UCS-2 format into the variable-length UTF-8 (UCS Transformation Format 8) format.

4. The method according to claim 3, further comprising a step for transforming characters from the variable-length UTF-8 format into the fixed-length UCS-2 format, useable when retrieving the data from the second table.

5. The method according to claim 4, wherein the steps of creating the tables and storing and retrieving data being performed in a database engine by a set of Application Programming Interfaces (APIs) specifying the table data Unicode format.

6. A system for efficient handling of multiple Unicode formats in the same database on a table level, comprising:

a computer having an electronic storage device coupled thereto for storing a database;

means, performed by the computer, for creating a plurality of database tables and specifying the table data Unicode format, including a first table for storing data in a first Unicode format and a second table for storing data in a second Unicode format;

means, performed by the computer, for inputting characters encoded in the first Unicode format;

a conversion means, performed by the computer, for transforming inputted characters into the second Unicode format and storing them in the second table; and means, performed by the computer, for storing unconverted inputted characters in the first table.

7. The system according to claim 6, wherein the system allowing efficient Unicode characters storage and character string length calculation in a computer data storage system.

8. The system according to claim 6, wherein the first Unicode format being the UCS-2 format and the second Unicode format being the UTF-8 format, and the conversion means transforming characters from the fixed-length UCS-2 format into the variable-length UTF-8 (UCS Transformation Format 8) format.

9. The system according to claim 8, further comprising a second conversion means for transforming characters from the variable-length UTF-8 format into the fixed-length UCS-2 format, useable when retrieving the data from the second table.

10. The system according to claim 9, wherein the means for creating the tables and storing and retrieving data being performed in a database engine by a set of Application Programming Interfaces (APIs) specifying the table data Unicode format.

11. A program storage device readable by a computer tangibly embodying a program of instructions executable by the computer to perform method steps for efficient handling of multiple Unicode formats in the same database on a table level, the method comprising the following steps:

(a) creating a plurality of database tables and specifying the table data Unicode format, including a first table for storing data in a first Unicode format and a second table for storing data in a second Unicode format;

(b) inputting characters encoded in the first Unicode format;

(c) when the table data Unicode format being the second Uniform format, transforming inputted characters into the second Unicode format and storing them in the second table; and (d) storing unconverted inputted characters in the first table.

12. The method according to claim 11, wherein the method allowing efficient Unicode characters storage and character string length calculation in a computer data storage system.

13. The method according to claim 11, wherein the first Unicode format being the UCS-2 format and the second Unicode format being the UTF-8 format, and the transforming step converting characters from the fixed-length UCS-2 format into the variable-length UTF-8 (UCS Transformation Format 8) format.

14. The method according to claim 13, further comprising a step for transforming characters from the variable-length UTF-8 format into the fixed-length UCS-2 format, useable when retrieving the data from the second table.

15. The method according to claim 14, wherein the steps of creating the tables and storing and retrieving data being performed in a database engine by a set of Application Programming Interfaces (APIs) specifying the table data Unicode format.

* * * * *